United States Patent
Li et al.

(10) Patent No.: US 6,299,086 B1
(45) Date of Patent: Oct. 9, 2001

(54) SPINCAST FISHING REEL HAVING NOVEL DRAG MECHANISM

(75) Inventors: Chi Shing Li, Hong Kong (CN); Stephen E. Gibson, Columbia, SC (US)

(73) Assignee: Shakepeare Company, Columbia, SC (US)

( * ) Notice: Subject to any disclaimer, the term of this patent is extended or adjusted under 35 U.S.C. 154(b) by 0 days.

(21) Appl. No.: 09/553,834

(22) Filed: Apr. 21, 2000

(51) Int. Cl.[7] .................................................. A01K 89/02
(52) U.S. Cl. ............................................ 242/244; 242/245
(58) Field of Search .................................... 242/244, 246, 242/234, 245

(56) References Cited

U.S. PATENT DOCUMENTS

| | | | |
|---|---|---|---|
| 3,381,914 | * | 5/1968 | Taggart .............................. 242/84.21 |
| 3,488,015 | * | 1/1970 | Taggart .............................. 242/84.51 |
| 4,378,914 | * | 4/1983 | Shackelford et al. ............. 242/84.21 |
| 4,402,469 | * | 9/1983 | Stiner ................................. 242/84.21 |
| 4,474,341 | * | 10/1984 | Shackelford et al. ............. 242/84.21 |
| 5,904,309 | * | 5/1999 | Takeuchi ............................. 242/243 |
| 5,918,827 | * | 7/1999 | Pulliam ............................... 242/322 |
| 5,947,400 | * | 9/1999 | Tsutsumi ............................. 242/322 |
| 5,950,947 | * | 9/1999 | Kirby .................................. 242/244 |

\* cited by examiner

*Primary Examiner*—Donald P. Walsh
*Assistant Examiner*—David A Jones
(74) *Attorney, Agent, or Firm*—Nelson Mullins Riley & Scarborough

(57) ABSTRACT

A spincast fishing reel has a reel frame to which front and rear covers are attached. The rear cover includes a pivotable thumb button which is depressed by a user when fishing line is to be cast. The front cover closes the face of the reel, but defines a forward opening through which the fishing line extends. A normally nonrotatable line spool is located inside of the front cover on a spool hub of the reel frame. Fishing line is wound onto the line spool by a rotatable pickup head located forward of the line spool. An improved drag arrangement includes a gear nut mounted on a threaded portion of the spool hub. A gear train arrangement is provided to operatively connect a suitable thumb wheel with the gear nut. Rotation of the thumb wheel by a user causes rotation of the gear nut, which varies the drag force imposed on the line spool.

34 Claims, 8 Drawing Sheets

SPINCAST FISHING REEL HAVING NOVEL DRAG MECHANISM

BACKGROUND OF THE INVENTION

The present invention relates to the art of fishing reels. More particularly, the invention relates to closed faced fishing reels commonly known as spincast reels.

Spincast fishing reels typically have a central body, or "reel frame," to which front and rear covers are attached. The reel frame includes a spool hub supporting a line spool on which the fishing line is wound. A pickup head, mounted forward of the spool, winds the line around the spool when rotated by a crank handle. The front cover is configured to surround and cover both the line spool and the pickup head. The line exits through a central opening at the forward end of the front cover.

The line spool is normally stationary, but will rotate if a certain tension is placed on the fishing line. Thus, line may be payed out if a hooked fish places undue tension on the fishing line. The tension threshold at which the fishing line will be payed out is set by the reel's drag mechanism.

Currently, many drag systems for spincast reels produce drag on the spool utilizing a screw driven by a thumb wheel. The screw pushes a steel washer against a drag washer that lies below the spool. The force exerted by the screw causes a friction force between the drag washer and the spool, thus resulting in "drag" on the spool. The friction force can be varied by tightening or loosening the screw, which is accomplished by turning the thumb wheel in a clockwise or counterclockwise direction. Because the force is applied at only one location on the washer, however, the drag may tend to feel rough when line is pulled from the spool.

SUMMARY OF THE INVENTION

The present invention recognizes and addresses the foregoing considerations, and others, of prior art constructions and methods.

Accordingly, it is an object of the present invention to provide a novel fishing reel.

It is a more particular object of the present invention to provide a novel construction for a fishing reel.

It is further object of the present invention to provide a fishing reel having a novel drag mechanism.

It is a more particular object of the present invention to provide a fishing reel having a drag mechanism which produces a more uniform drag force than many drag systems of the prior art.

Some of these objects are achieved by a fishing reel comprising a reel frame including a spool support hub having a threaded portion. An axially movable drag nut is located on the threaded portion of the spool support hub. A normally nonrotatable line spool is also mounted on the spool support hub. The line spool is retained on the spool support hub between an axially fixed retaining element and the drag nut. Rotation of the drag nut effects axial movement thereof so as to vary the drag force imposed on the line spool. In some exemplary embodiments, the reel further includes a thumb wheel operatively connected to the drag nut such that rotation of the thumb wheel effects axial movement of the drag nut. Preferably, the drag nut in such embodiments will define gear teeth on an outer surface thereof. The thumb wheel may be operatively connected to the drag nut via a gear train arrangement. Such a gear train arrangement may include a first gear shaft extending through a generally circular frame wall of the reel frame. The first gear shaft may be configured having first and second gears located at each end thereof, with the second gear engaging the drag nut.

Often, the thumb wheel may have a generally cylindrical configuration defining gear teeth on an outer surface thereof. The first gear of the first gear shaft may engage the thumb wheel in such embodiments. Preferably, a portion of the thumb wheel will extend through a slot defined in the reel frame.

In other embodiments, the thumb wheel may be configured as a star-type thumb wheel located exterior to the reel's housing. Preferably, a gear element will be juxtaposed to the thumb wheel, engaging a third gear located at the end of a second gear shaft. A fourth gear, located at the opposite end of the second gear shaft, may engage the first gear of the gear train arrangement in such embodiments.

Embodiments are contemplated in which first and second drag washers are located on the spool support hub so as to engage respective side faces of the line spool. At least one spring washer may also be located on the spool support hub in such embodiments. The spring washer will be compressed as the drag force is increased.

Other objects of the present invention are achieved by a fishing reel comprising a reel frame including a spool support hub. A normally nonrotatable line spool is mounted on the spool support hub. A pickup head, axially and rotatably movable with respect to the line spool, is also provided. A drag nut, located on the spool support hub, defines gear teeth on an outer surface thereof.

The reel further includes a thumb wheel operatively connected to the drag nut. Rotation of the thumb wheel effects axial movement of the drag nut, thereby varying the drag force imposed on the line spool. A closed-face cover is connected to the reel frame to enclose the line spool and the pickup head. The cover includes a forward opening therein through which fishing line extends.

Still further objects of the present invention are achieved by a fishing reel comprising a reel frame including a spool support hub. A normally nonrotatable line spool is mounted on the spool support hub. A pickup head, axially and rotatably movable with respect to the line spool, is also provided. A crank handle is operatively associated with the pickup head such that rotation of the crank handle causes rotation of the pickup head. A drag nut, located on the spool support hub, rotates to effect axial movement thereof. Rotation of the drag nut results in a variation of the drag force imposed on the line spool.

In this case, the reel further comprises a closed-face cover connected to the reel frame to enclose the line spool and the pickup head. This cover includes a forward opening therein through which fishing line extends. A rear cover is also connected to the reel frame, and has a pivotable thumb button mounted thereon which is actuatable to allow casting of the fishing line.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying drawings, in which.

Figure 1:
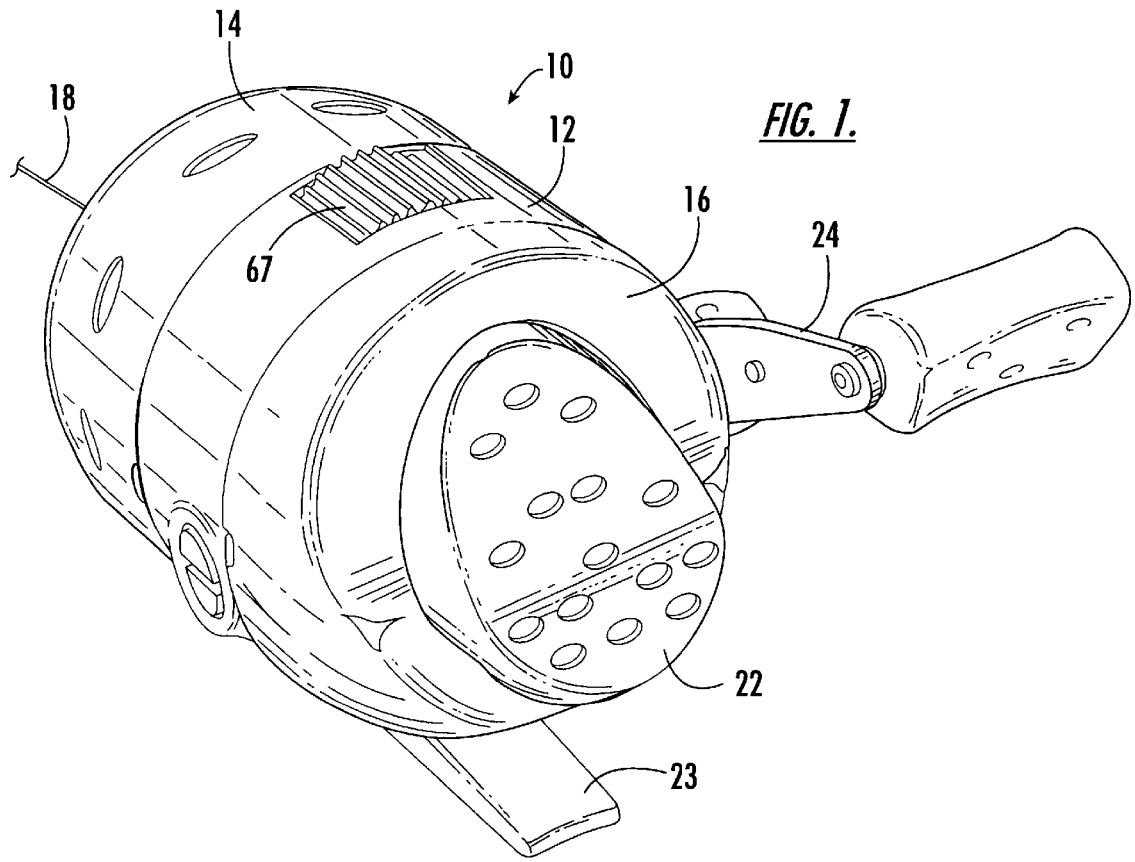
FIG. 1 is a rear perspective view of a spincast fishing reel constructed in accordance with the present invention.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention.

Figure 2:
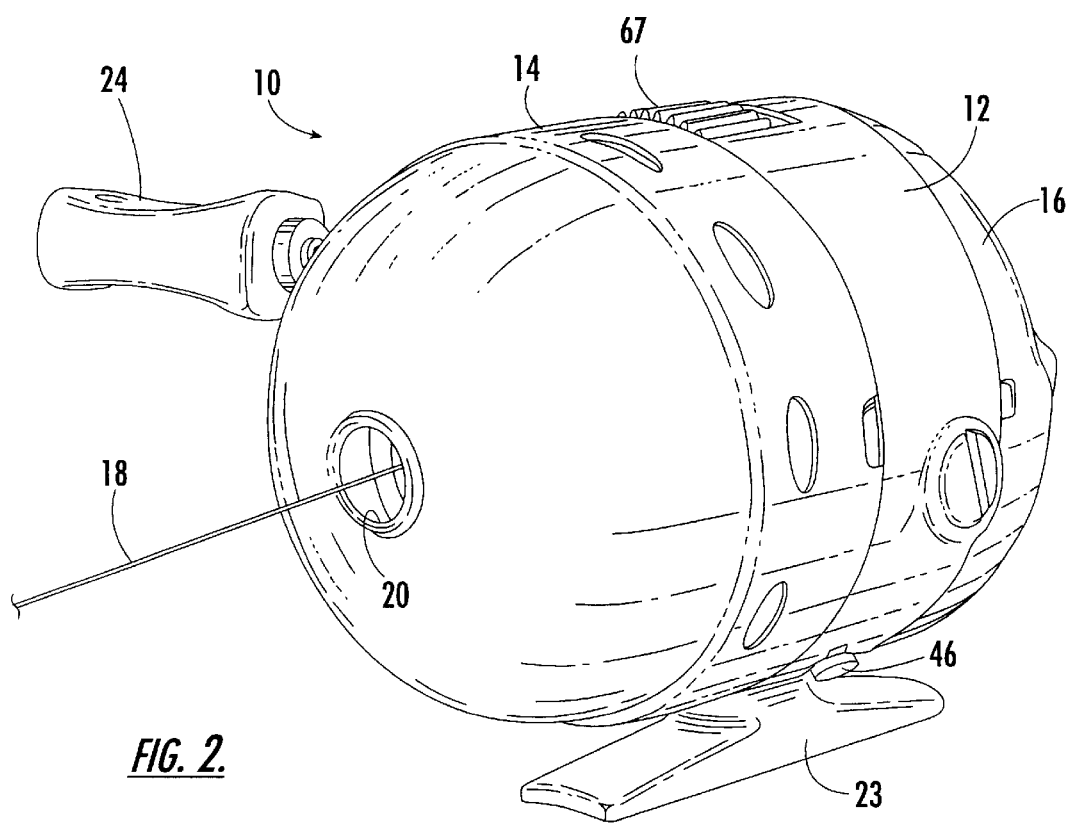
FIG. 2 is a front perspective view of the reel shown in FIG. 1.

FIGS. 1 and 2 illustrate an improved spincast reel 10 constructed in accordance with the present invention. Reel 10 includes a reel frame 12 to which a front cover 14 and a rear cover 16 are detachably connected. Fishing line 18 extends through a forward opening 20 defined in front cover 14. In addition, a pivotable thumb button 22 is carried by rear cover 16. A user depresses thumb button 22 to allow casting of fishing line 18 in a well-known manner. Preferably, reel frame 12 includes an attachment foot 23 to permit the reel to be mounted to a fishing rod.

Figure 3:
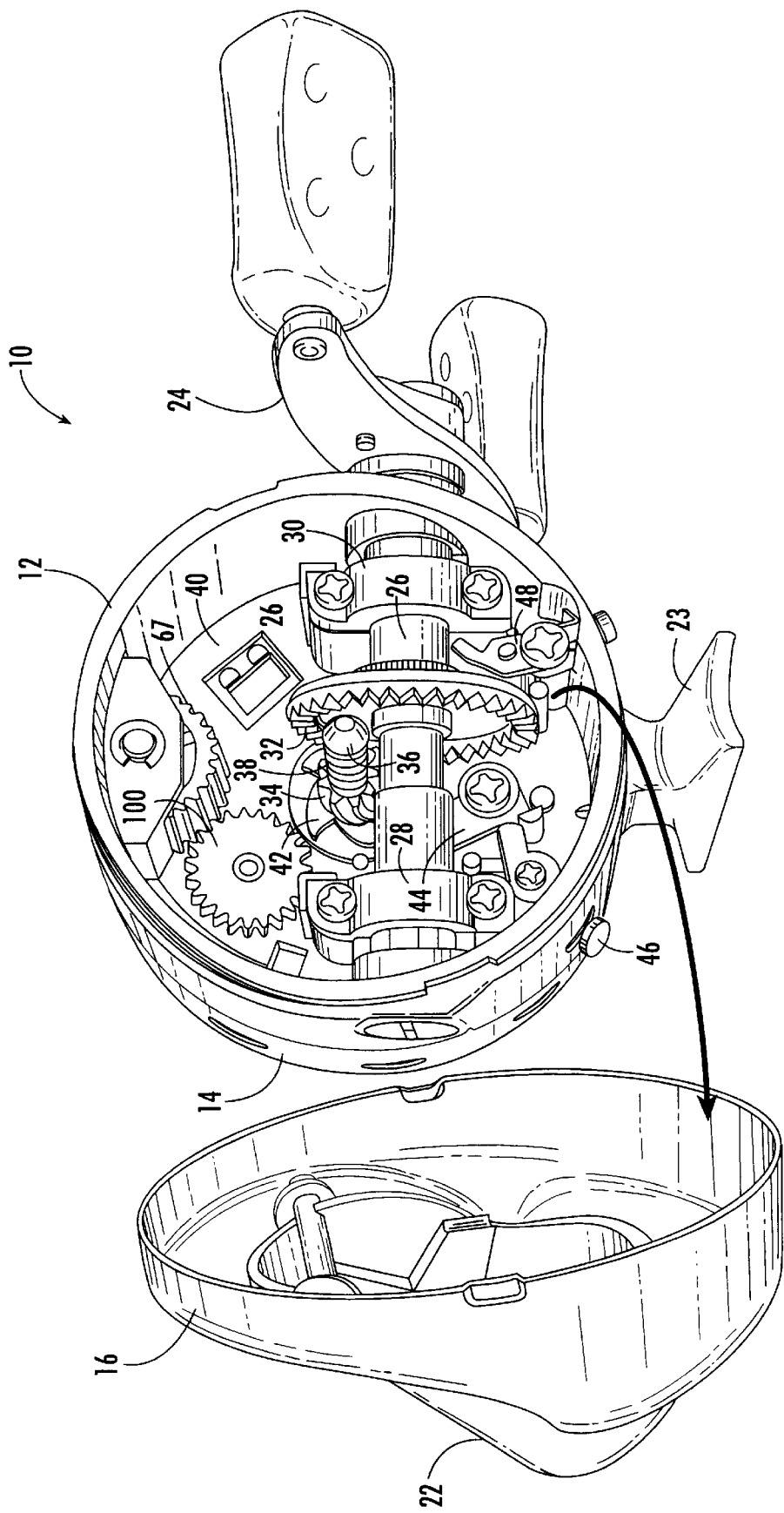
FIG. 3 is a rear view of the reel shown in FIG. 1, with the rear cover detached to reveal various internal components thereof.

A crank handle 24 is rotated by a user when it is desired to wind fishing line 18 back in. As shown in FIG. 3, crank handle 24 is attached to the end of a transverse shaft 26 supported for rotation by bushings 28 and 30. A bevel gear 32, carried by shaft 26, engages a pinion 34. Rotation of pinion 34 causes simultaneous rotation of a main shaft 36 extending therethrough.

Main shaft 36 is axially movable with respect to pinion 34, but is normally urged in an axially rearward direction by a helical spring 38. The end of main shaft 36 is pushed forward when thumb button 22 is depressed, thus permitting the fishing line to be cast.

Pinion 34 is supported for rotation by a circular frame wall 40, which generally divides the enclosure of reel 10 into front and rear compartments. A ratchet wheel 42 is located at the base of pinion 34 for engaging a pawl member 44. Wheel 42 and pawl member 44 form an anti-reverse ratchet mechanism which prevents undesired rotation of main shaft 36 in the counterclockwise direction. The anti-reverse mechanism, however, may be selectively disengaged via lever 46. The illustrated embodiment further includes a bait click mechanism 48 which may also be engaged or disengaged at the option of the user.

Figure 4:
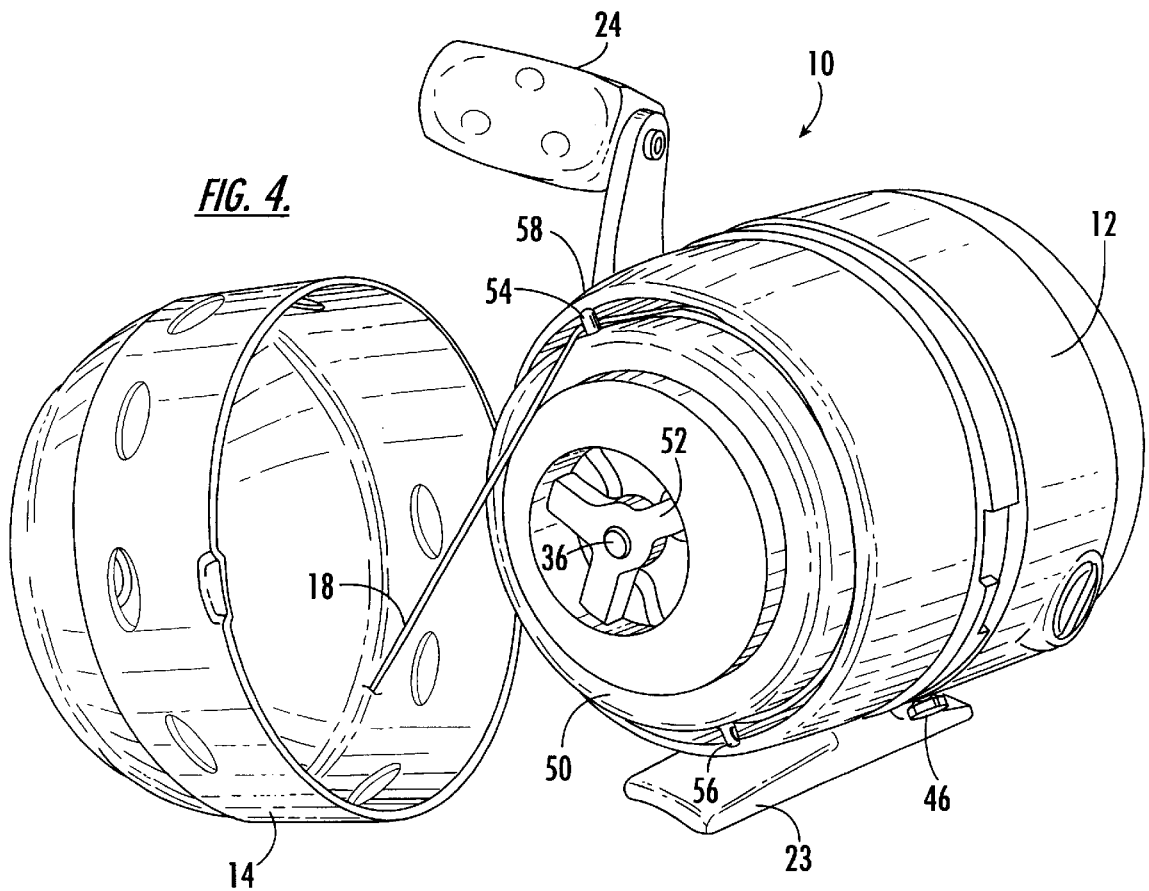
FIG. 4 is a front perspective view of the reel shown in FIG. 1, with the front cover detached to reveal the line pickup head and annular shroud element located thereabout.

Front cover 14 is detached in FIG. 4 to illustrate various components located within the front compartment of reel 10. As shown, a pickup head 50 includes a suitable nut element 52 for attachment to a threaded end of main shaft 36. Rotation of crank handle 24 thus causes a concomitant rotation of pickup head 50.

In this case, pickup head 50 is constructed having a pair of diametrically opposed pickup pins 54 and 56. As will be explained more fully below, pickup pins 54 and 56 are retracted into pickup head 50 during casting of fishing line 18. When fishing line 18 is being retrieved, however, pickup pins 54 and 56 are extended (as shown) to engage the line.

Figure 5:
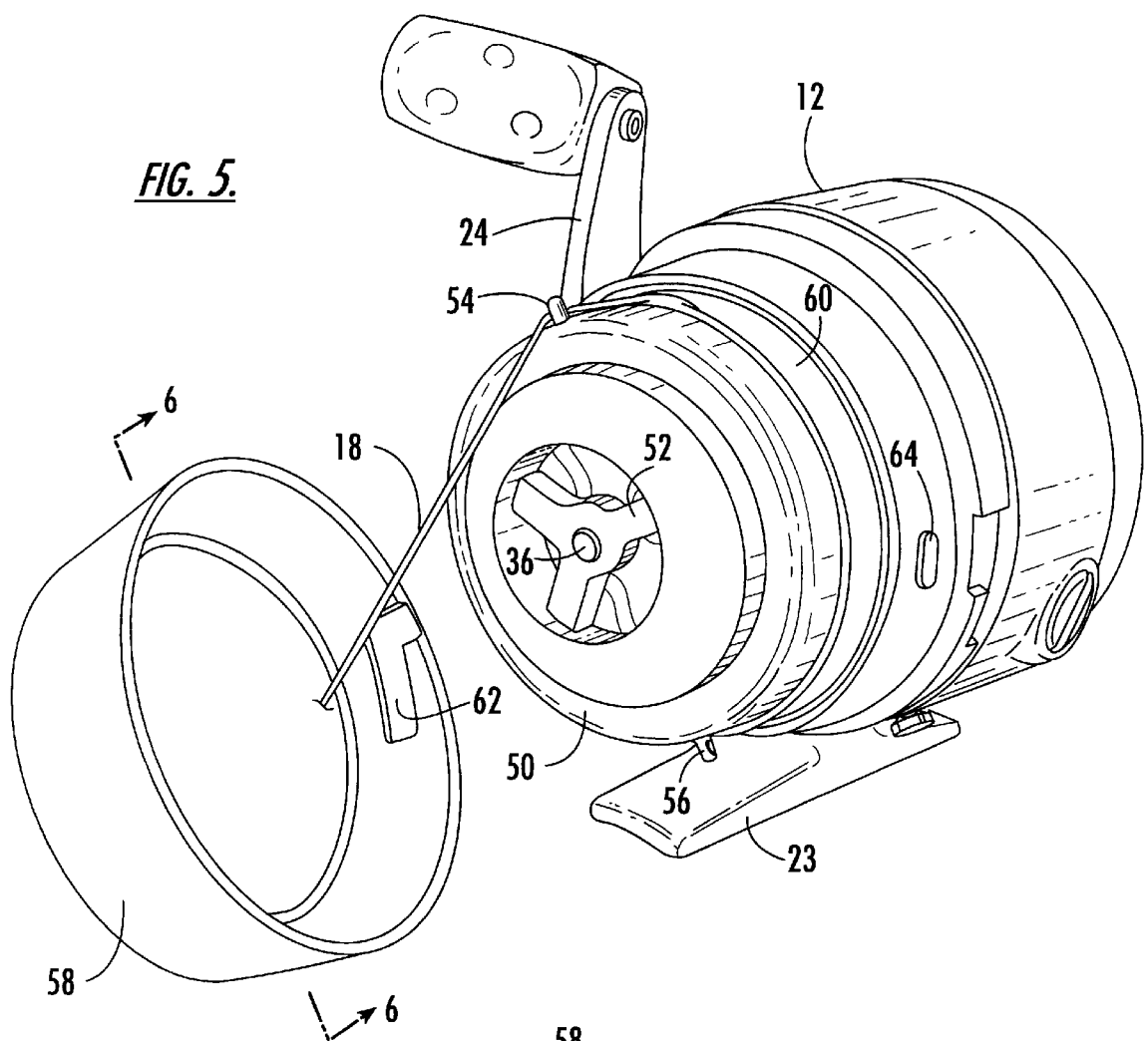
FIG. 5 is a view similar to FIG. 4, with the annular shroud element detached.
Figure 6:
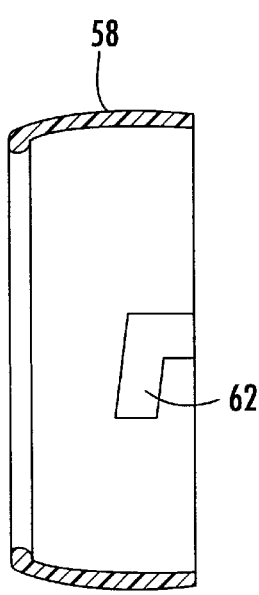
FIG. 6 is a cross-sectional view of the annular shroud element taken along line 6—6 of FIG. 5.

Referring now to FIGS. 5 and 6, reel frame 12 includes an annular shroud element 58 in the illustrated embodiment. Shroud element 58 at least partially surrounds an outer circumferential surface of pickup head 50 when fishing line 18 is being retrieved, to effectively trap line 18 into engagement with one of the pickup pins. In this manner, the line is easily and repeatedly engaged by the pickup pins as it is wound onto line spool 60.

While shroud element 58 may be a unitary extension of frame 12, it is configured as a detachable component in the illustrated embodiment. In this case, shroud element 58 defines suitable slots, such as slot 62, for engaging lugs located on the main portion of reel frame 12, such as lug 64. It should be appreciated, however, that other suitable means of attaching shroud element 58, such as screws, adhesives, or snap fits, may also be used.

In some exemplary embodiments, shroud element 58 may be constructed of a suitable transparent material, such as a glass and mineral reinforced nylon. As a result, the user will be able to see how much line is left on line spool 60 without removing shroud element 58.

Figure 7:
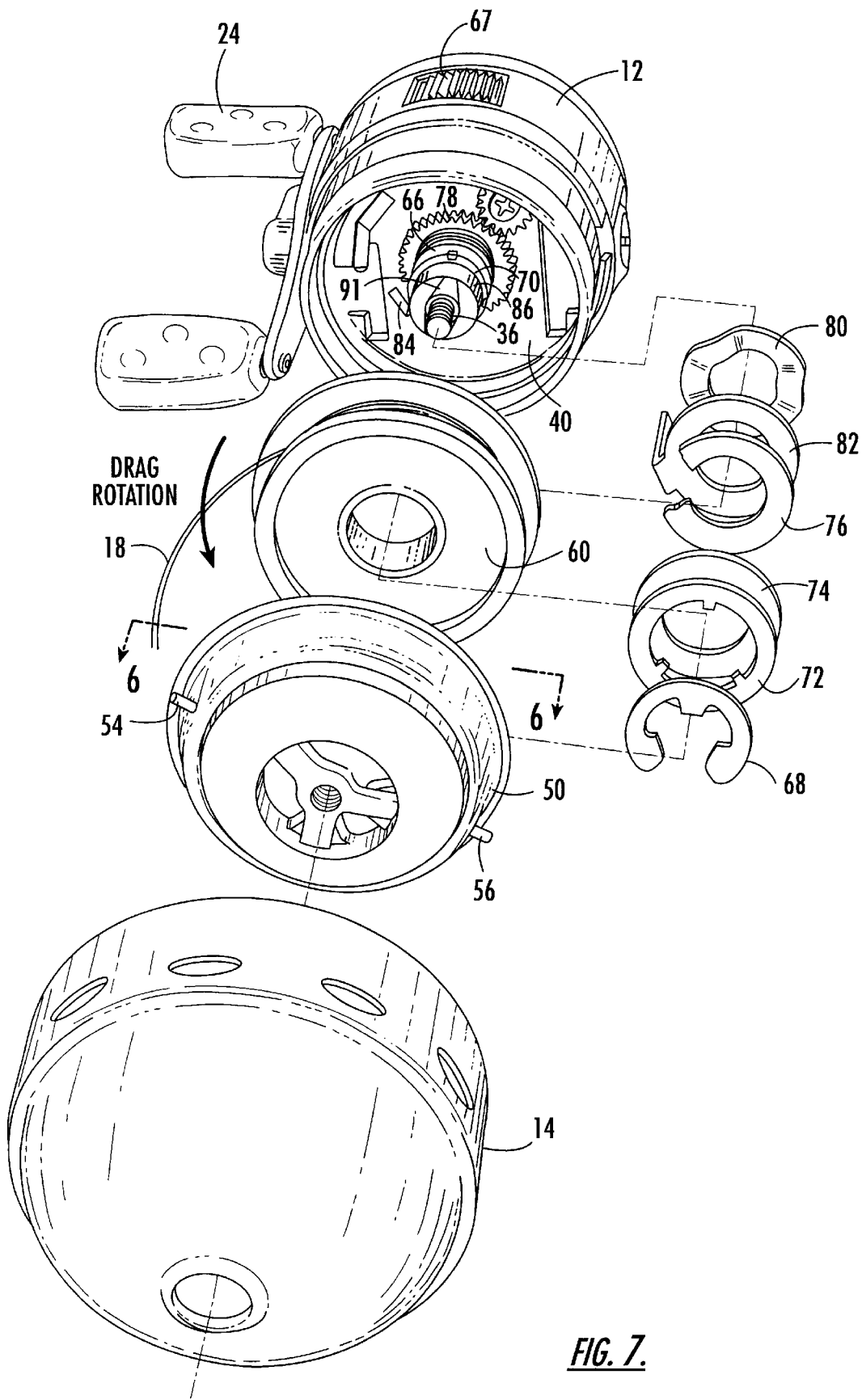
FIG. 7 is a partially exploded view of the reel shown in FIG. 1.

Referring now to FIG. 7, line spool 60 is mounted on a cylindrical hub 66 integrally extending from frame wall 40. Line spool 60 is normally nonrotatable when mounted on hub 66, but may undergo limited rotary slippage under line tension. The force required to produce such slippage is controlled by the reel's drag mechanism. The drag force may be adjusted by a thumb wheel 67 projecting through a slot in the outer surface of reel frame 12. Line spool 60 is retained in position by a suitable retaining element, here a retaining clip 68. As shown, clip 68 is received in a slot 70 defined in hub 66.

In the illustrated embodiment, a keyed washer 72 and a drag washer 74 are located between retaining clip 68 and the front face of line spool 60. The back face of line spool 60 is similarly engaged by a drag washer 76. In addition, a gear nut 78 is located on a threaded base portion of hub 66. A spring washer 80 and a tanged washer 82 are located between gear nut 78 and drag washer 76. The tang of washer 82 is received in a slot 84 defined in frame wall 40.

Figure 8:
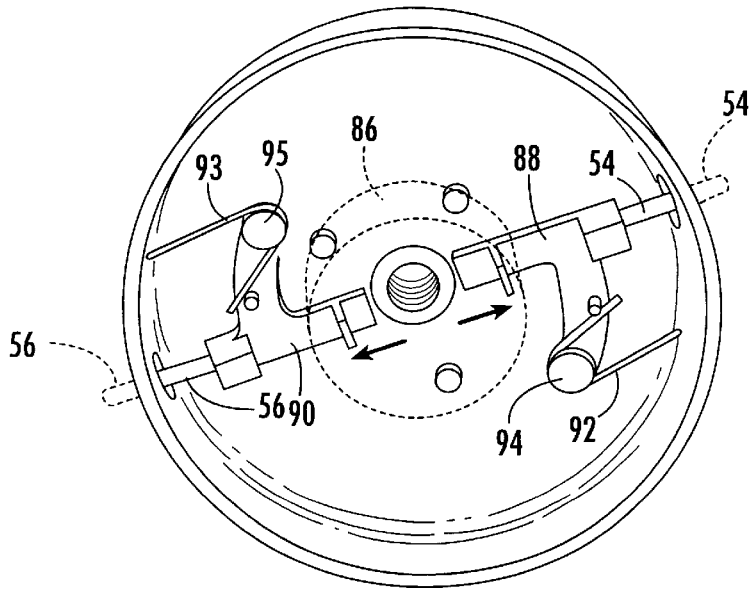
FIG. 8 is a rear view of the pickup head showing the manner in which the retractable pickup pins operate.

The forward portion 86 of hub 66 defines a cylindrical surface which forces pickup pins 54 and 56 into their extended positions. This can be explained with reference to FIG. 8, where it can be seen that pickup pins 54 and 56 are attached to respective followers 88 and 90. Followers 88 and 90 ride upon the outer surface of forward portion 86 when line 18 is being retrieved.

During casting, pickup head 50 is moved axially forward such that followers 88 and 90 are located ahead of the hub's forward portion 86. Respective springs 92 and 93 urge followers 88 and 90 inward, thus retracting pickup pins 54 and 56. In other words, springs 92 and 93 cause followers 88 and 90 to pivot about respective pivot points 94 and 95, thereby pulling pickup pins 54 and 56 through slots in the outer surface of pickup head 50.

After casting, the user rotates crank handle 24, which causes pickup head 50 to also rotate. In this case, a relatively shallow cam surface 91 is located on the front of hub 66 to facilitate the outward movement of followers 88 and 90. When followers 88 and 90 are moved outward in this manner, the force of spring 38 causes shaft 36 to move in a rearward axial direction. Pickup head 50 is then positioned to wind the fishing line onto spool 60.

Figure 9:
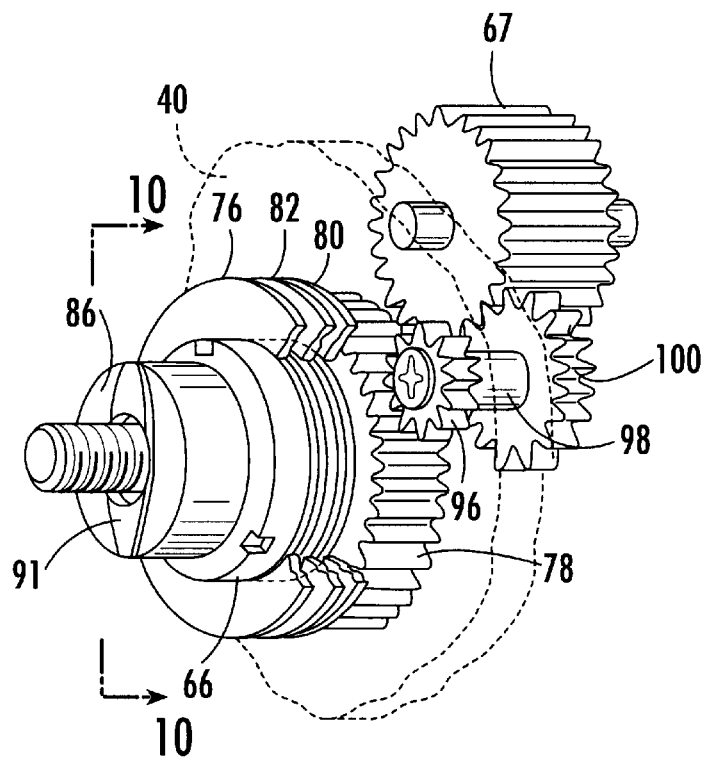
FIG. 9 is an enlarged perspective view of a preferred gear drag arrangement utilized in the reel shown in FIG. 1.
Figure 10:
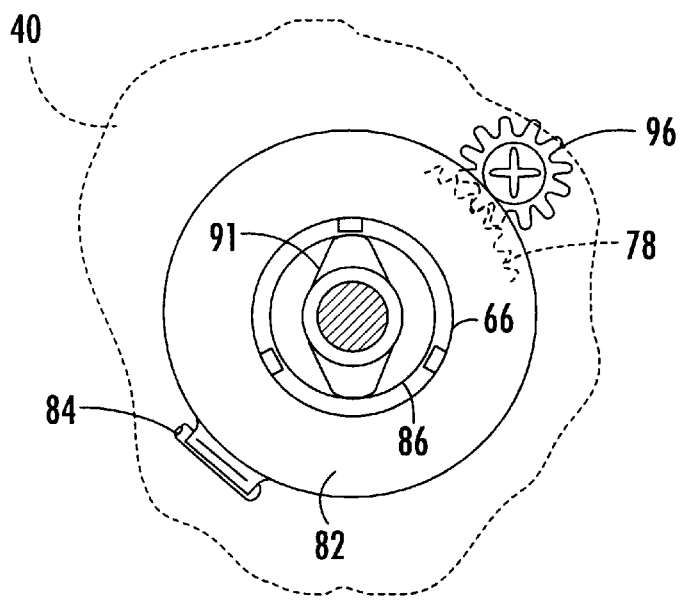
FIG. 10 is an end view taken along line 10—10 of FIG. 9.

Referring now to FIGS. 9 and 10, a suitable gear train arrangement is provided to operatively connect thumb wheel 67 with gear nut 78. In this case, for example, it can be seen that gear nut 78 is engaged by a smaller gear 96. Gear 96 is, in turn, located at one end of a shaft 98 extending through frame wall 40. The other end of shaft 98 carries a gear 100 engaging the outer surface of thumb wheel 67. Rotation of thumb wheel 67 by a user will thus cause a resulting rotation of gear nut 78.

As gear nut 78 rotates, the helical threads on its inside surface will cause it to move axially along the threaded portion of hub 66. It will be appreciated that the direction of axial movement will depend upon the direction of rotation.

Figure 11:
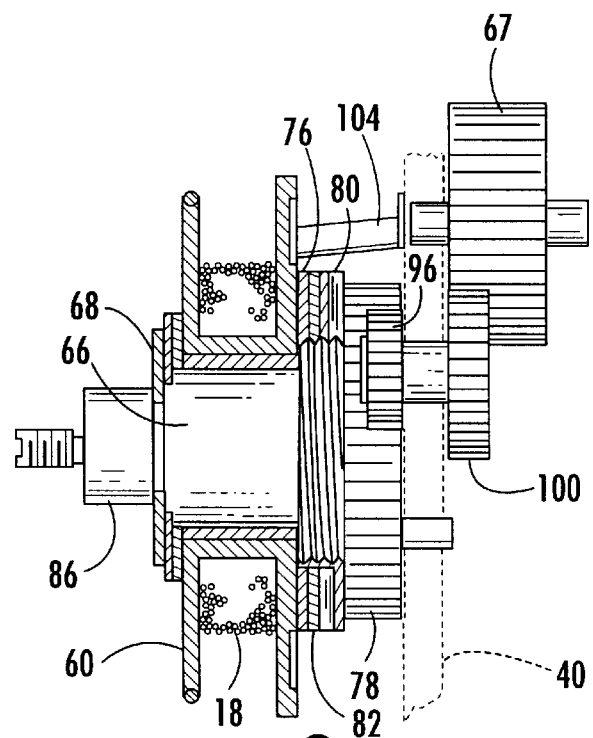
FIG. 11 is a partial cross-sectional view showing the gear drag arrangement of FIG. 9.
Figure 12:
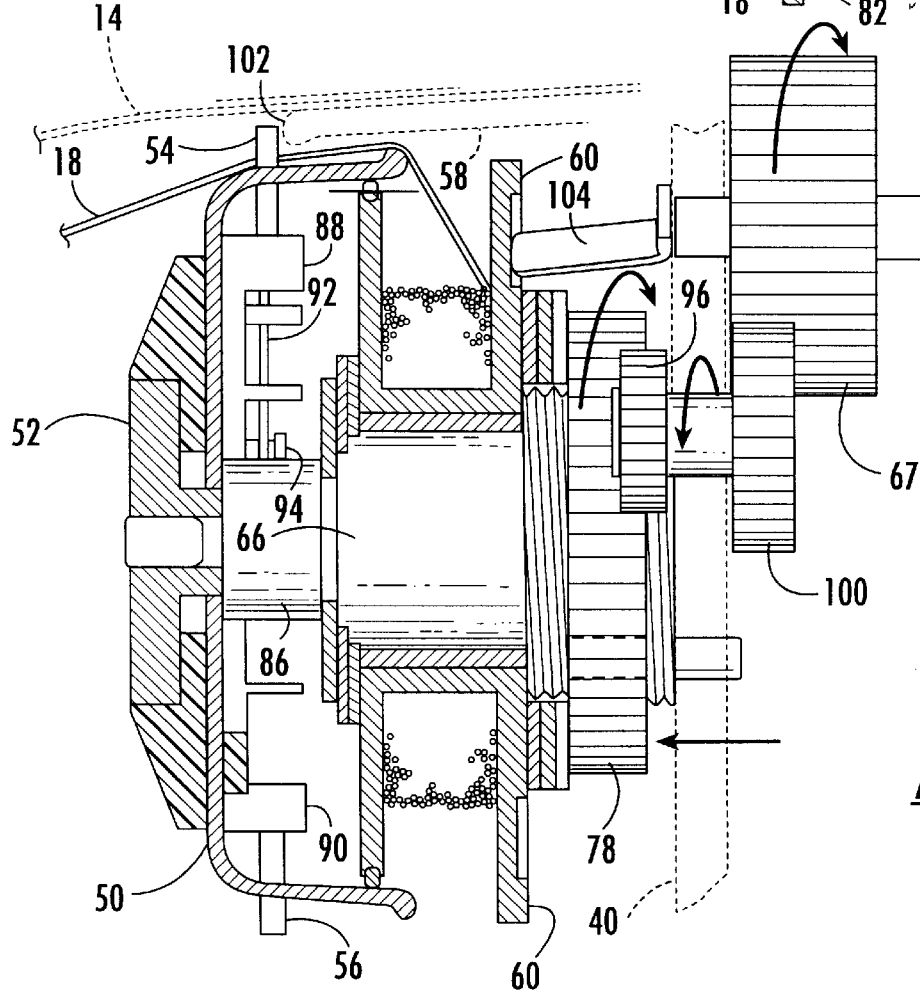
FIG. 12 is a cross-sectional view similar to FIG. 11 showing various additional details.

The operation of the drag mechanism utilized in reel 10 can be more fully explained with reference to FIGS. 11 and 12. In FIG. 11, gear nut 78 is located against wall 40 to impose minimum drag force on line spool 60. In FIG. 12, however, thumb wheel 67 is being rotated in a clockwise direction, which results in a clockwise rotation of gear nut 78. This causes compression of spring washer 80, forcing drag washers 74 and 76 against the respective sides of line spool 60. In other words, the force applied by gear nut 78 pinches the line spool between drag washers 74 and 76, causing a frictional resistance to rotation of spool 60 around hub 66.

In contrast with prior art arrangements, gear nut 78 applies the drag force evenly over the face of spool 68, rather than at one point. In addition, there is a slight mechanical advantage created by the gears that is not present in many prior art arrangements. One preferred embodiment of reel 10 uses a gear ratio of 0.725:1 (i.e., one turn of thumb wheel 67 results in 0.725 turns of gear nut 78).

It will be appreciated that the axial distance moved by gear nut 78 is controlled by the pitch of the thread on its inner diameter. A greater pitch will yield a greater axial distance moved per rotation of thumb wheel 67. This produces a shorter range of the drag from the highest to the lowest setting. Spring washer 80 provides a comfortable resistance to tightening the thumb wheel, and helps to maintain the position of the drag while the reel is being used.

Certain additional aspects of reel 10 can also be easily explained with reference to FIG. 12. In this case, for example, it can be seen that a forward edge 102 of shroud element 58 is located axially adjacent to pickup pins 54 and 56 when pickup head 50 is positioned for line retrieval. In such embodiments, the inner diameter of shroud element 58 at forward edge 102 may preferably be equal to or less than the radial extent of the pickup pins. Alternatively, shroud element 58 may be configured to extend over pickup pins 54 and 56. An annular lip having an inner diameter less than the radial extent of the extended pickup pins may be defined on the inside surface of shroud element 58 in such embodiments. Such a lip would preferably be located axially adjacent to the pickup pins on the side closest to frame wall 40.

A click feature may also be integrated into the system so that there is an audible indication when line spool 60 is being rotated against the drag force. In this case, the audible indication is provided by a tab 104 mounted to frame wall 40. Tab 104, which may be made from a suitable plastic or metal, engages an irregular surface defined on the back side of spool 60. As spool 60 rotates, tab 104 flexes to produce the desired clicking noise.

Figure 13:
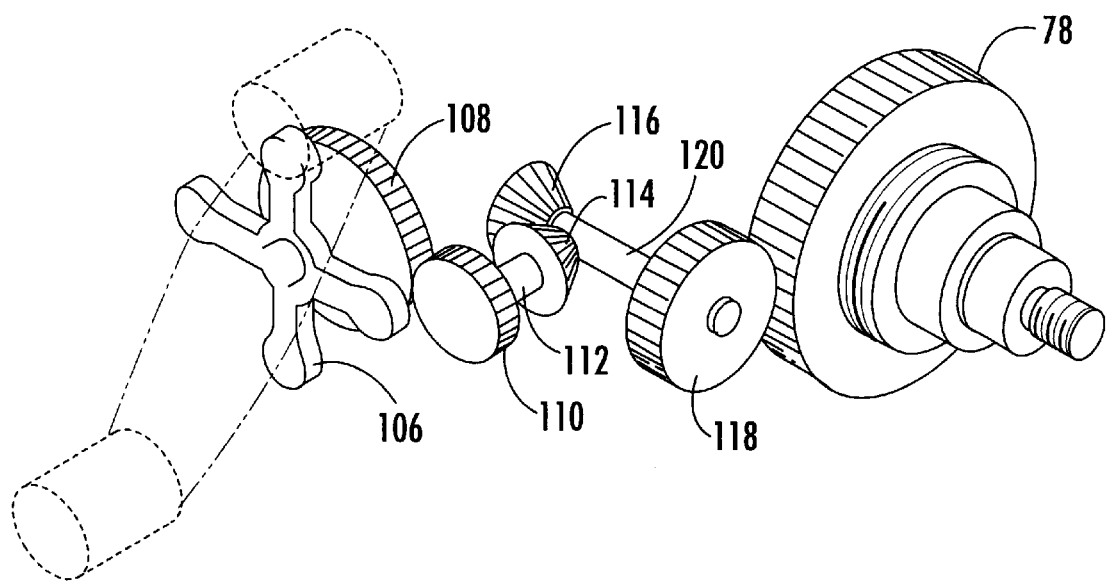
FIG. 13 is a schematic diagram of another embodiment of the gear drag arrangement.

FIG. 13 illustrates an alternative gear train arrangement which may be used with a drag mechanism as described above. In this case, however, a star type thumb wheel 106 is mounted on a shaft coaxial with the cross shaft which carries the crank handle. A spur gear 108 is attached to the posterior side of thumb wheel 106, as shown. Spur gear 108 engages another spur gear 110 protruding from the reel's frame. Spur gear 110 is located at one end of a shaft 112, the other end of which carries a bevel gear 114 (which is located inside the reel's housing). Bevel gear 114 engages a second bevel gear 116 rigidly connected to a spur gear 118. In this case, for example, bevel gear 116 and spur gear 118 are interconnected by a rigid shaft 120. Spur gear 118, in turn, engages gear nut 78 to produce axial movement thereof in the manner described above.

While preferred embodiments of the invention have been shown and described, modifications and variations may be made thereto by those of ordinary skill in the art without departing from the spirit and scope of the present invention. For example, it may be desirable in some applications to have the drag nut directly engage the line spool without the use of intervening washers. In addition, various types of levers or other manual actuators may be used in lieu of a thumb wheel to vary the drag force. It may also be possible to use a toothed belt or the like to cause rotation of the drag nut instead of gear train arrangements discussed above.

It should also be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A fishing reel comprising:
    a reel frame including a spool support hub, said spool support hub having a threaded portion;
    an axially-movable drag nut located on said threaded portion of said spool support hub;
    a normally nonrotatable line spool mounted on said spool support hub;
    an axially fixed retaining element retaining said line spool on said spool support hub, said line spool being located axially between said drag nut and said retaining element; and
    whereby rotation of said drag nut effects axial movement thereof to vary the drag force imposed on said line spool.

2. A fishing reel as set forth in claim 1, further comprising a thumb wheel operatively connected to said drag nut such that rotation of said thumb wheel effects axial movement of said drag nut.

3. A fishing reel as set forth in claim 2, wherein said drag nut defines gear teeth on an outer surface thereof.

4. A fishing reel as set forth in claim 3, said thumb wheel being operatively connected to said drag nut via a gear train arrangement.

5. A fishing reel as set forth in claim 4, wherein said gear train arrangement includes a first gear shaft having first and second gears located at each end thereof, said second gear engaging said drag nut.

6. A fishing reel as set forth in claim 5, wherein said reel frame includes a generally circular frame wall, said first gear shaft extending through said frame wall and being rotatably supported thereby.

7. A fishing reel as set forth in claim 6, wherein said thumb wheel has a generally cylindrical configuration and defines gear teeth on an outer surface thereof, said first gear engaging said thumb wheel.

8. A fishing reel as set forth in claim 7, wherein said first and second gears are spur gears.

9. A fishing reel as set forth in claim 7, wherein a portion of said thumb wheel extends through a slot defined in said reel frame.

10. A fishing reel as set forth in claim 4, wherein said thumb wheel is a star-type thumb wheel located exterior to a housing of said fishing reel.

11. A fishing reel as set forth in claim 10, wherein said thumb wheel has a gear element juxtaposed thereto.

12. A fishing reel as set forth in claim 11, wherein said gear train arrangement includes a second gear shaft having third and fourth gears located at respective ends thereof, said third gear engaging said gear element of said thumb wheel and said fourth gear engaging said first gear.

13. A fishing reel as set forth in claim 1, further comprising first and second drag washers located on said spool support hub to engage respective side faces of said line spool.

14. A fishing reel as set forth in claim 13, further comprising at least one spring washer located on said spool support hub, said spring washer being compressed as said drag force is increased.

15. A fishing reel as set forth in claim 1, comprising:
a closed-face cover connected to said reel frame to enclose said line spool, said cover including a forward opening therein through which fishing line extends; and
said reel frame includes an attachment foot for attaching said reel to a fishing rod.

16. A fishing reel comprising:
a reel frame including a spool support hub;
a normally nonrotatable line spool mounted on said spool support hub;
a pickup head axially and rotatably movable with respect to said line spool;
a drag nut located on said spool support hub, said drag nut defining threads on an inside surface thereof and further defining gear teeth on an outer surface thereof about its entire outer circumference;
a thumb wheel operatively connected to said drag nut such that rotation of said thumb wheel rotates said drag nut to cause axial movement thereof to thereby vary the drag force imposed on said line spool; and
a closed-face cover connected to said reel frame to enclose said line spool and said pickup head, said cover including a forward opening therein through which fishing line extends.

17. A fishing reel as set forth in claim 16, wherein said thumb wheel is operatively connected to said drag nut via a gear train arrangement.

18. A fishing reel as set forth in claim 17, wherein said gear train arrangement includes a first gear shaft having first and second gears located at each end thereof, said second gear engaging said drag nut.

19. A fishing reel as set forth in claim 18, wherein said reel frame includes a generally circular frame wall, said first gear shaft extending through said frame wall and being rotatably supported thereby.

20. A fishing reel as set forth in claim 19, wherein said thumb wheel has a generally cylindrical configuration and defines gear teeth on an outer surface thereof, said first gear engaging said thumb wheel.

21. A fishing reel as set forth in claim 20, wherein a portion of said thumb wheel extends through a slot defined in said reel frame.

22. A fishing reel as set forth in claim 18, wherein said thumb wheel is a star-type thumb wheel located on exterior to a housing of said fishing reel.

23. A fishing reel as set forth in claim 22, wherein said thumb wheel has a gear element juxtaposed thereto.

24. A fishing reel as set forth in claim 23, wherein said gear train arrangement includes a second gear shaft having third and fourth gears located at respective ends thereof, said third gear engaging said gear element of said thumb wheel and said fourth gear engaging said first gear.

25. A fishing reel as set forth in claim 16, further comprising first and second drag washers located on said spool support hub to engage respective side faces of said line spool.

26. A fishing reel as set forth in claim 25, further comprising at least one spring washer located on said spool support hub, said spring washer being compressed as said drag force is increased.

27. A fishing reel comprising:
a reel frame including a spool support hub;
a normally nonrotatable line spool mounted on said spool support hub;
a pickup head axially and rotatably movable with respect to said line spool;
a crank handle operatively associated with said pickup head such that rotation of said crank handle causes rotation of said pickup head;
a drag nut located on said spool support hub, said drag nut being rotatable about said spool support hub over an extent of at least 360° to effect axial movement thereof such that the drag force imposed on said line spool will be varied;
a closed-face cover connected to said reel frame to enclose said line spool and said pickup head, said cover including a forward opening therein through which fishing line extends; and
a rear cover connected to said reel frame, said rear cover having a pivotable thumb button mounted thereon, said thumb button being actuatable to allow casting of said fishing line.

28. A fishing reel as set forth in claim 27, further comprising a manual actuator operative to effect rotation of said drag nut.

29. A fishing reel as set forth in claim 28, wherein said manual actuator is a thumb wheel having a generally cylindrical configuration, a portion of said thumb wheel extending partially through a slot defined in said reel frame.

30. A fishing reel as set forth in claim 29, wherein said thumb wheel extends through a slot defined in said reel frame.

31. A fishing reel as set forth in claim 29, wherein said thumb wheel defines gear teeth on an outer surface thereof.

32. A fishing reel as set forth in claim 28, wherein said manual actuator is a star-type thumb wheel located on exterior to a housing of said fishing reel.

33. A fishing reel as set forth in claim 27, further comprising first and second drag washers located on said spool support hub to engage respective side faces of said line spool.

34. A fishing reel as set forth in claim 33, further comprising at least one spring washer located on said spool support hub, said spring washer being compressed as said drag force is increased.

* * * * *